United States Patent
Takahashi

(10) Patent No.: US 7,915,773 B2
(45) Date of Patent: Mar. 29, 2011

(54) ROBOT WITH INTERNAL PRESSURE EXPLOSION-PROOF STRUCTURE

(75) Inventor: Shingi Takahashi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/686,388

(22) Filed: Jan. 13, 2010

(65) Prior Publication Data

US 2010/0109459 A1    May 6, 2010

Related U.S. Application Data

(63) Continuation of application No. PCT/JP2008/063868, filed on Aug. 1, 2008.

(30) Foreign Application Priority Data

Sep. 11, 2007 (JP) .................................. 2007-235029

(51) Int. Cl.
*H02K 5/10* (2006.01)
(52) U.S. Cl. ............................................ 310/88; 310/83

(58) Field of Classification Search .................... 310/83, 310/85–89, 98–99
See application file for complete search history.

(56) References Cited

U.S. PATENT DOCUMENTS

| | | | | |
|---|---|---|---|---|
| 4,668,146 | A | * | 5/1987 | Ageta ............................... 414/4 |
| 4,984,745 | A | * | 1/1991 | Akeel et al. ............... 239/587.2 |
| 4,985,653 | A | * | 1/1991 | Takagi et al. ................. 310/88 |
| 5,212,432 | A | | 5/1993 | Ohtani et al. |
| 6,477,913 | B1 | * | 11/2002 | Akeel et al. ............... 74/490.03 |
| 7,456,753 | B2 | * | 11/2008 | Kitagawa et al. ............ 340/614 |

FOREIGN PATENT DOCUMENTS

| | | |
|---|---|---|
| JP | 03-136788 | 6/1991 |
| JP | 03-136789 | 6/1991 |
| JP | 06-278078 | 10/1994 |
| JP | 2007-021612 | 2/2007 |

\* cited by examiner

*Primary Examiner* — Thanh Lam
(74) *Attorney, Agent, or Firm* — Ditthavong Mori & Steiner, P.C.

(57) ABSTRACT

A robot includes a plurality of motors that drive respective joint shafts and gas-tight chambers in which the motors are disposed. The robot is placed in a second ambience, and at least one of the joint shafts is provided with a hollow motor integrated with a reduction gear.

10 Claims, 3 Drawing Sheets

ROBOT WITH INTERNAL PRESSURE EXPLOSION-PROOF STRUCTURE

CROSS-REFERENCE TO RELATED APPLICATIONS

The present application is a continuation application of PCT/JP2008/063868, filed Aug. 1, 2008, which claims priority to Japanese Patent Application No. 2007-235029, filed Sep. 11, 2007. The contents of these applications are incorporated herein by reference in their entirety.

BACKGROUND OF THE INVENTION

1. Field of the Invention

The present invention relates to a robot with an internal pressure explosion-proof structure.

2. Discussion of the Background

In an example of an arm structure of a robot having an internal pressure explosion-proof structure according to the related art, a motor is disposed in an airtight chamber, as described in Japanese Unexamined Patent Application Publication No. 2007-21612.

The motors, which drive the arm of the robot, are disposed in the gas-tight chambers provided on a side surface of the arm. Each motor is provided with a reduction gear at one side thereof, and is driven so as to operate the arm of the robot. A feeder line for the motor is disposed so as to extend through a cable cover (gas-tight chamber) attached to the motor at the other side thereof, and is connected to the motor.

SUMMARY OF THE INVENTION

According to one aspect of the present invention, a robot includes a plurality of motors that drive respective joint shafts and gas-tight chambers in which the motors are disposed. The robot is placed in a second ambience, and at least one of the joint shafts is provided with a hollow motor integrated with a reduction gear.

According to another aspect of the present invention, a robot includes a plurality of motors that drive respective joint shafts and gas-tight chambers in which the motors are disposed. The robot is placed in a second ambience, and the joint shafts disposed in the gas-tight chambers that are provided in an upper arm of the robot are provided with a hollow motor integrated with a reduction gear.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
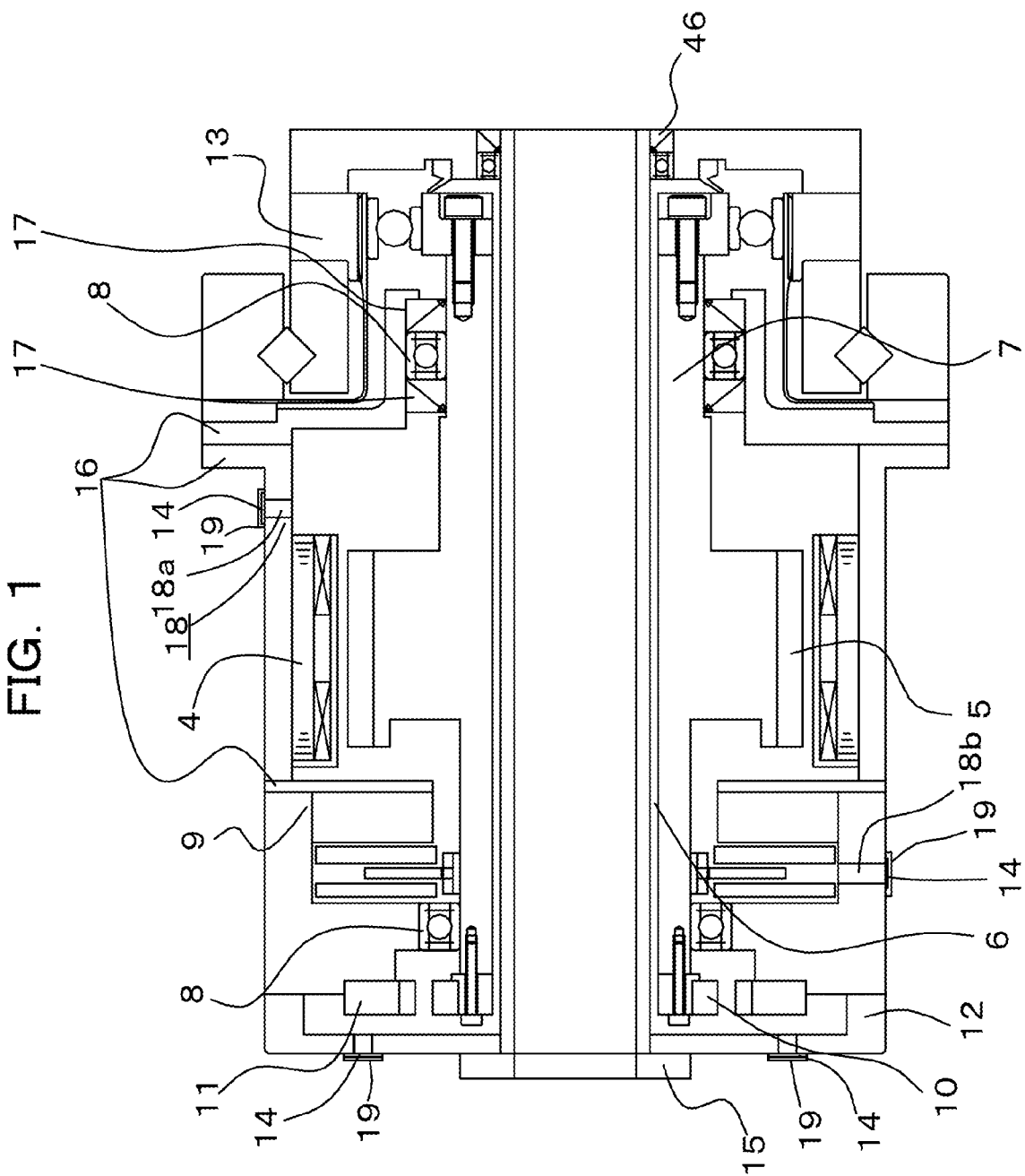
FIG. 1 is a sectional view of a motor included in an internal pressure explosion-proof robot.

Embodiments will now be described with reference to the accompanying drawings, wherein like reference numerals designate corresponding or identical elements throughout the various drawings.

Figure 2:
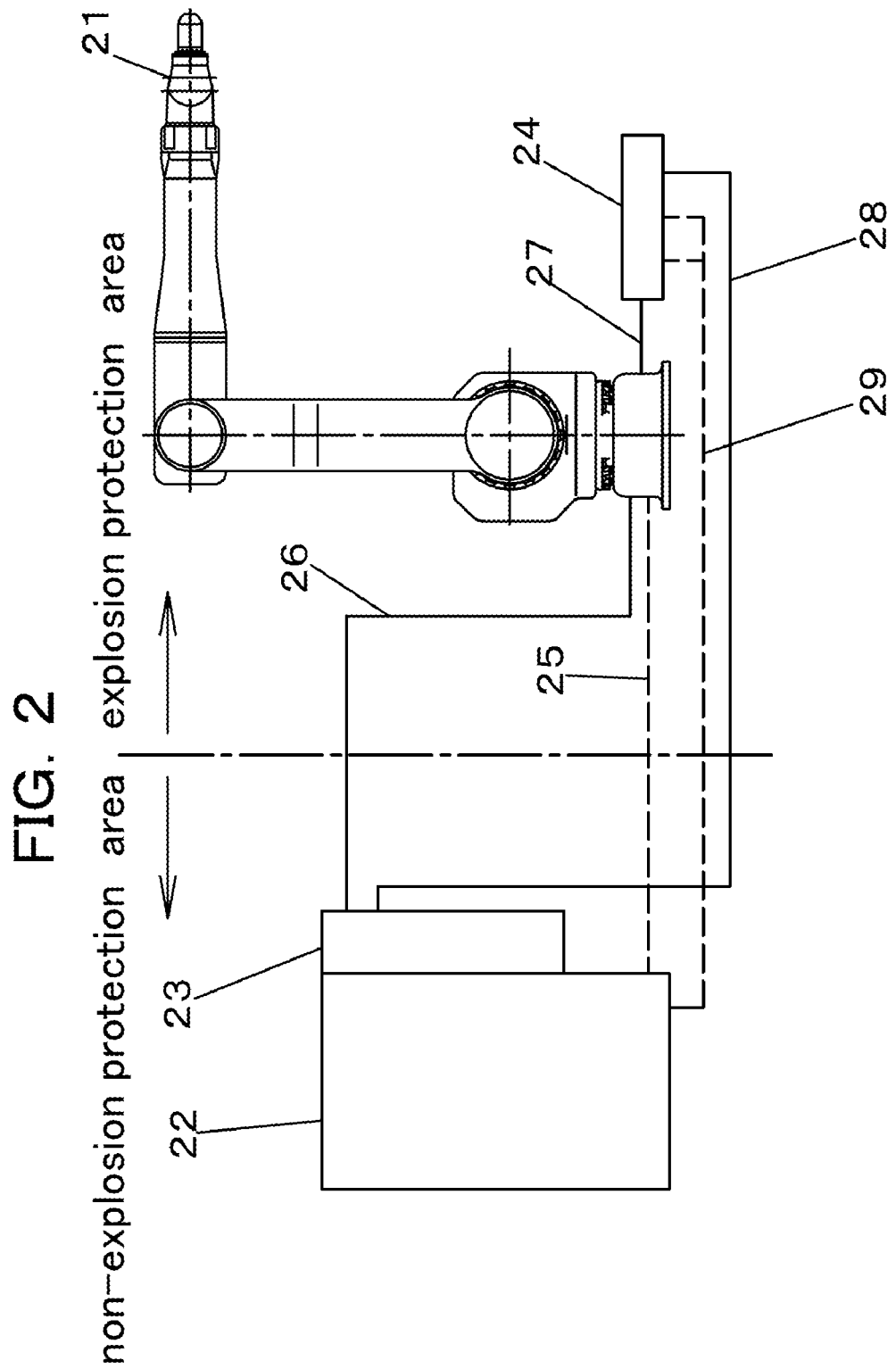
FIG. 2 is a system configuration diagram of the internal pressure explosion-proof robot.
Figure 3:
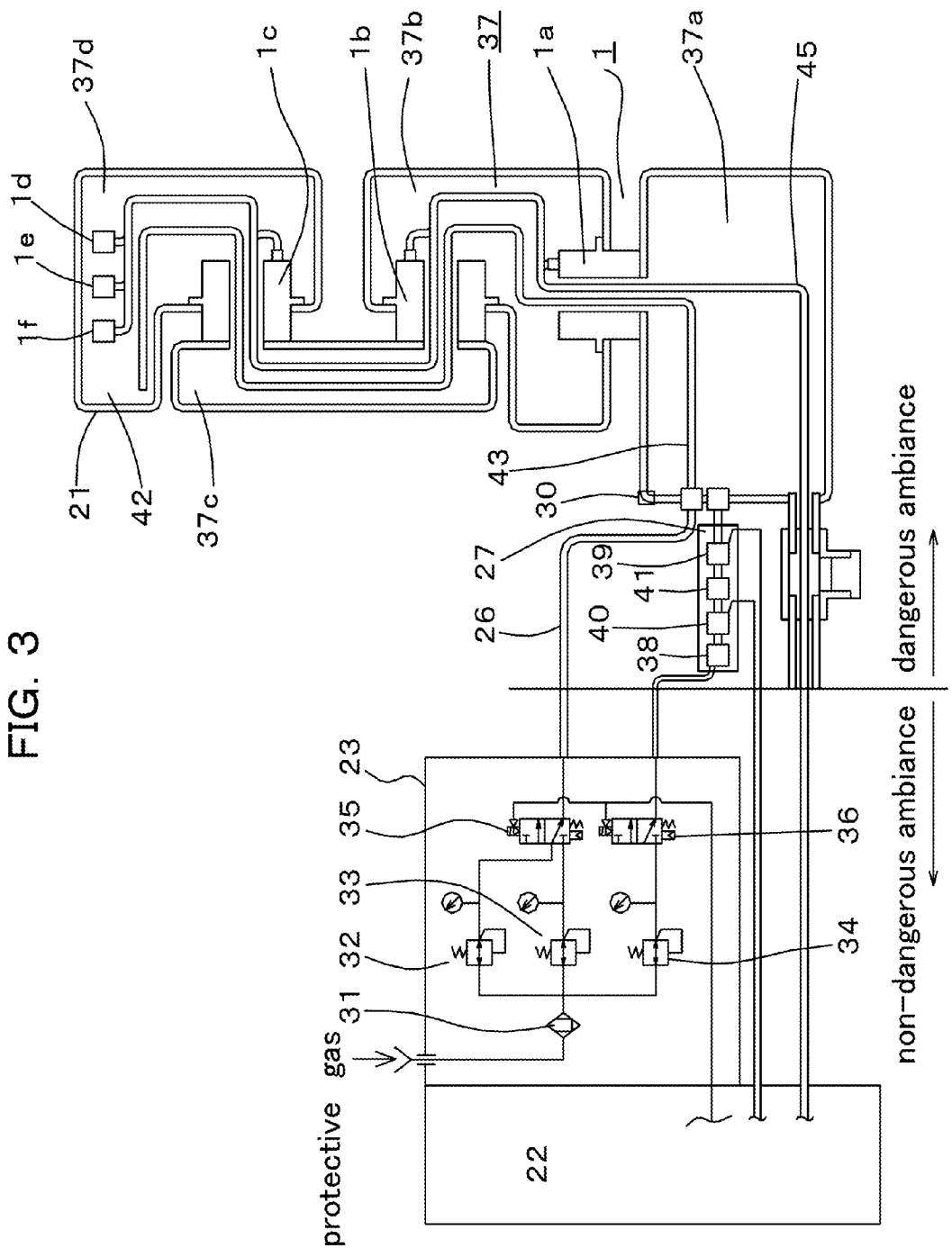
FIG. 3 is a schematic diagram of the internal pressure explosion-proof robot.

First, the schematic configuration of a system including a robot with an internal pressure explosion-proof structure will be described. In FIGS. 2 and 3, the system includes a robot 21 having an internal pressure explosion-proof structure and a controller 22 which controls the robot 21. A gas supply unit 23 for supplying protective gas to gas-tight chambers 37, which are disposed in the robot 21 and are substantially sealed, is attached to the controller 22. A plurality of motor units 1 which drive respective joints of the robot 21 are disposed in the gas-tight chambers 37. In addition, a gas discharge unit 24 which controls gas discharged from the gas-tight chambers 37 is attached to the robot 21. The controller 22 and the gas supply unit 23 are placed in a first ambience, and the robot 21 and the gas discharge unit 24 are placed in a second ambience, such as a paint plant, where explosive gas exists. The robot 21 and the controller 22 are connected to each other with a control cable 25, and the controller 22 can control the motors 1 for driving the respective joints through cables 45 that extend through the gas-tight chambers 37 in the robot 21. In addition, the cables 45 extend through hollow sections of the motors 1, which are provided at joint sections of the robot 21. The gas supply unit 23 and the robot 21 are connected to each other with a pipe line 26, and the protective gas is supplied from the gas supply unit 23 to the gas-tight chambers 37 in the robot 21. In addition, the robot 21 and the gas discharge unit 24 are connected to each other by a pipe line 27, and the gas discharge unit 24 detects or blocks the gas discharged from the gas-tight chambers 37. Therefore, the gas discharge unit 24 is connected to the controller 22 with a communication cable 29. In addition, an open valve, which will be described below, is disposed in the gas discharge unit 24, and a pipe line 28 through which control gas used in a control process is supplied is provided to connect the gas supply unit 23 and the gas discharge unit 24 to each other.

Referring to FIG. 3, the gas supply unit 23 receives compressed air (protective gas) from an external compressed-gas source (not shown). The protective gas passes through a filter 31 and is divided into three passages which continue to pressure regulators 32, 33, and 34. The pressure regulator 32 adjusts the pressure of the protective gas in the robot 21 to a pressure slightly higher than that in the second ambience. Similarly, the pressure regulator 33 adjusts the pressure of the protective gas to a pressure higher than the pressure adjusted by the pressure regulator 32. The protective gas whose pressure is adjusted by the pressure regulators 32 and 33 is supplied from a solenoid valve 35 to the gas-tight chambers 37 in the robot 21 through pipe lines 26 and 43. The robot 21 includes a plurality of gas-tight chambers 37, which are gas-tight chambers 37a, 37b, 37c, and 37d. A plurality of motors 1 are disposed in the gas-tight chambers. In the present embodiment, six motors are provided. The motors 1a, 1b, 1c, 1d, 1e, and 1f drive the respective joints of the robot 21.

The pipe line 26 is connected to the pipe line 43 in the robot 21 through a pipe-line connector 30 disposed in a lower section of the robot 21. The pipe line 43 discharges the protective gas at a discharge position 42 located at an end of each gas-tight chamber 37, that is, at a position farthest from the pipe-line connector 30 in each gas-tight chamber 37.

One end of the pipe line 27 is connected to the gas-tight chambers 37, and the other end thereof is connected to an open valve 38 disposed in the gas discharge unit 24. A flow switch 39, a pressure detector 40, and a pressure regulating valve 41 are connected to the pipe line 27 at intermediate positions thereof (there may be a case where the flow switch 39 cannot be attached). One end of the communication cable 29 is connected to the flow switch 39 and the pressure detector 40, and the other end thereof is connected to the controller 22.

The communication cable 29 transmits signals from the flow switch 39 and the pressure detector 40 to the controller 22. The pressure detector 40 outputs a signal to the controller 22 when the pressure in the gas-tight chambers 37 becomes lower than a predetermined value. The flow switch 39 outputs a signal to the controller 22 when a predetermined amount of gas passes therethrough. The pressure regulating valve 41 discharges gas when the pressure in the pipe line 27, that is, the internal pressure of the gas-tight chambers 37, exceeds a predetermined value, thereby reducing the internal pressure of the gas-tight chambers 37.

The pressure regulator 34 adjusts the pressure of the protective gas that passes through the remaining one of the three passages for the protective gas that passes through the filter 31. The pressure regulator 34 adjusts the pressure of the protective gas to a pressure at which a solenoid valve 36 can be operated, and is connected to the open valve 38 through the solenoid valve 36 and the pipe line 28. The open valve 38 is operated by the gas pressure applied by the protective gas supplied through the solenoid valve 36. The open valve 38 discharges or blocks the gas guided from the gas-tight chambers 37 through the pipe line 27.

In the present embodiment, all of the joint shafts are provided with the respective motors 1. However, three motors 1d to 1f, for example, disposed in the gas-tight chamber 37d may be provided for a joint shaft. In such a structure, the width of the arm portion of the gas-tight chamber 37d can be reduced and the risk of interference with an object being painted can be reduced.

Next, a special structure of a motor used in the robot 21 with the internal pressure explosion-proof structure will be described. This motor is used as a motor for driving each joint in the robot 21, as shown in FIG. 2. In this example, the motor is structured as a servo motor. Referring to FIG. 1, an electromagnetic unit 4 is formed by molding a unit obtained by placing a coil in a laminated core, in which magnetic steel sheets are laminated together, with resin. A permanent field magnet 5 is disposed around a rotating shaft 7 that has a hollow diameter section 6 at the center, and the rotating shaft 7 is supported in the electromagnetic unit 4 by a bearing 8 provided at one or each end of a fixed section 16 that is provided on the electromagnetic unit 4. A double sided electromagnetic brake 9 (hereinafter referred to as brake) can secure the rotating shaft 7 by securing a rotating disc, which is provided on the rotating shaft 7 with a hub therebetween, with a spring pressure. A magnetic detector 11 detects a rotational angle and a rotational speed with a detection permanent field magnet 10, which is protected by a cover 12 and provided at an end of the rotating shaft 7 opposite the load end. A hollow motor is constituted by the above-mentioned components. A hollow reduction gear 13 (hereinafter referred to as reduction gear) is attached to the hollow motor at an output end thereof. The rotational angle and the rotational speed may also be detected by an optical encoder or resolver. In the case where the motor is installed in an apparatus, such as an assembly/transfer multi-axis robot, a wiring cable is disposed so as to extend through the hollow diameter section 6 provided at the center of the rotating shaft 7. Therefore, a protection cover 15 for protecting the wiring cable is provided so as to extend into the hollow diameter section 6 from the fixed section 16. Therefore, the wiring cable can be prevented from being damaged by the rotation of the rotating shaft 7.

An oil seal member 17 is provided on each side of the bearing 8 disposed at the reduction-gear-13 side of the fixed section 16. The oil seal members 17 are oriented in directions such as to block the entrance of foreign matter from the outside. Owing to this structure, the motor section can be separated from the reduction gear 13, and oil constituents can be prevented from entering the motor section from the reduction gear 13. In addition, a plurality of through holes 18 are formed in the fixed section 16. One through hole 18a is disposed between the oil seal members 17 and an area in which the electromagnetic unit 4, which is molded with resin, and the permanent field magnet 5 are provided. Another through hole 18b is formed in a side surface of the brake 9. Other through holes 18c and 18d are formed in the cover 12 which protects the magnetic detector 11 for detecting the rotational angle and the rotational speed with the detection permanent field magnet 10. With this structure, the gas in the motor section and the encoder section can be replaced in the scavenging operation while the state in which the inner space of the reduction gear 13 is filled with oil constituents is maintained. In the present embodiment, the diameter of the through holes 18 is about 10 mm. A filter 14 is fixed to each through hole 18 by a cover 19. The filter 14 prevents foreign matter from entering the motor section through the through hole 18, and a mesh size thereof is carefully designed such that the filter 14 does not obstruct the replacement of gas in the scavenging operation. In this example, the mesh size is set to 2 to 7 ml/cm$^2$·sec. In the motor having the size shown in FIG. 1, four filters 14 with the above-described mesh size are provided for the through holes at the respective positions. In addition, an oil seal member 46 is provided between a hollow section in an output shaft of the reduction gear 13 and the protection cover 15, and is oriented so as to prevent the entrance of foreign matter from the outside. In addition, an oil seal member 50 is disposed between the end of the rotating shaft 7 opposite the load end and the protection cover 15.

The robot with the internal pressure explosion-proof structure includes the motor having the above-described structure. A normal operation of the robot will now be described. Here, the normal operation means the state of operation in which the robot performs painting or the like. The normal operation is performed after the scavenging operation, which will be described below, is finished. In other words, energization for the operation is started after the explosive gas in the second ambience is discharged from the inside of the gas-tight chambers 37. In the normal operation, the open valve 38 is closed and the gas-tight chambers 37 are filled with air having a pressure that is adjusted by the pressure regulator 32 to a pressure slightly higher than that in the second ambience. Therefore, the pressure in the gas-tight chambers 37 in the robot 21 is maintained at a pressure slightly higher than that in the second ambience. The pressure detector 40 connected to the pipe line 27 checks for the state in which the pressure in the gas-tight chambers 37 is reduced to below the pressure slightly higher than that in the second ambience.

Next, the scavenging operation will be described. First, the power of the controller 22 is turned on, and the controller 22 outputs a switching command to the solenoid valve 36. Accordingly, the protective gas whose pressure is adjusted by the pressure regulator 33 to a pressure higher than that in the normal operation is supplied to the gas-tight chambers 37 through the pipe line 26. At this time, the timer (not shown) included in the controller 22 starts counting time. In addition, at this time, the open valve 38 is continuously closed.

The pipe line 26 discharges the protective gas at positions near the motors. Since each motor has the through holes as described above, the gas in the inner space of each motor is reliably replaced by the protective gas.

Then, after the timer completes the measurement of a predetermined time period, the controller 22 outputs a switching command to the solenoid valve 36 to open the open valve 38. The time period measured by the timer is set to a period required for the pressure in the gas-tight chambers to reach a predetermined pressure, and is measured in advance through experiments or other means. At the time when the open valve 38 is opened, the flow switch 39 starts measuring the amount of gas ejected from the gas-tight chambers 37. When a predetermined amount of gas flows out from the gas-tight chambers 37, the controller 22 receives a signal from the flow switch 39 and outputs a switching command to the solenoid valve 36, so that the open valve 38 is closed. Thus, the scavenging operation is completed. Then, power can be supplied to the motors and the normal operation of the robot can be performed.

Also in the scavenging operation, the pressure detector 40 checks for the state in which the pressure in the gas-tight chambers 37 is reduced to below the pressure slightly higher than that in the second ambience. In addition, the pressure regulating valve 41 operates to reduce the pressure if the pressure in the gas-tight chambers 37 becomes too high. In the case where the flow switch 39 cannot be provided, the pressure detector 40 may be used in place of the flow switch 39 in the scavenging operation by adjusting the pressure in the gas-tight chambers 37 such that the pressure is not reduced to below the pressure that is slightly higher than that in the second ambience.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A robot with an internal pressure explosion-proof structure, comprising:
    a plurality of motors that drive respective joint shafts; and
    gas-tight chambers in which the motors are disposed,
        wherein the robot is placed in a second ambience, and at least one of the joint shafts is provided with a hollow motor integrated with a reduction gear, and
        wherein a through hole is provided in the at least one of the joint shafts of the motor along an axial direction of the at least one of the joint shafts.

2. The robot with the internal pressure explosion-proof structure according to claim 1, wherein a wiring cable extends through a hollow section of the hollow motor integrated with the reduction gear.

3. The robot with the internal pressure explosion-proof structure according to claim 1, wherein a motor section of the hollow motor integrated with the reduction gear is provided with a sealing member at each side of a bearing disposed at the reduction-gear side of a fixed section of the motor, the sealing member being oriented in a direction such as to block the entrance of foreign matter from the outside.

4. The robot with the internal pressure explosion-proof structure according to claim 1, wherein a motor section of the hollow motor integrated with the reduction gear is provided with a through hole in a space between an electromagnetic unit in the motor section and a sealing member disposed at the reduction-gear side, the through hole extending in a direction perpendicular to an axis of the hollow motor.

5. The robot with the internal pressure explosion-proof structure according to claim 1, wherein a motor section of the hollow motor integrated with the reduction gear is provided with a sealing member at a position between a hollow section of an output shaft of the reduction gear provided at the motor section and a protecting cover, the sealing member being oriented in a direction such as to block the entrance of foreign matter from the outside.

6. A robot with an internal pressure explosion-proof structure, comprising:
    a plurality of motors that drive respective joint shafts; and
    gas-tight chambers in which the motors are disposed,
        wherein the robot is placed in a second ambience, and the joint shafts disposed in the gas-tight chambers that are provided in an upper arm of the robot are provided with a hollow motor integrated with a reduction gear, and
        wherein a through hole is provided in each of the joint shafts of the motor along an axial direction of each of the joint shafts.

7. The robot with the internal pressure explosion-proof structure according to claim 6, wherein a wiring cable extends through a hollow section of the hollow motor integrated with the reduction gear.

8. The robot with the internal pressure explosion-proof structure according to claim 6, wherein a motor section of the hollow motor integrated with the reduction gear is provided with a sealing member at each side of a bearing disposed at the reduction-gear side of a fixed section of the motor, the sealing member being oriented in a direction such as to block the entrance of foreign matter from the outside.

9. The robot with the internal pressure explosion-proof structure according to claim 6, wherein a motor section of the hollow motor integrated with the reduction gear is provided with a through hole in a space between an electromagnetic unit in the motor section and a sealing member disposed at the reduction-gear side, the through hole extending in a direction perpendicular to an axis of the hollow motor.

10. The robot with the internal pressure explosion-proof structure according to claim 6, wherein a motor section of the hollow motor integrated with the reduction gear is provided with a sealing member at a position between a hollow section of an output shaft of the reduction gear provided at the motor section and a protecting cover, the sealing member being oriented in a direction such as to block the entrance of foreign matter from the outside.

* * * * *

/

(12) EX PARTE REEXAMINATION CERTIFICATE (9255th)
United States Patent
Takahashi

(10) Number: US 7,915,773 C1
(45) Certificate Issued: Aug. 28, 2012

(54) ROBOT WITH INTERNAL PRESSURE EXPLOSION-PROOF STRUCTURE

(75) Inventor: Shingi Takahashi, Fukuoka (JP)

(73) Assignee: Kabushiki Kaisha Yaskawa Denki, Kurosaki-Shiroishi, Yahatanishi-Ku, Kitakyushu-Shi, Fukuoka (JP)

Reexamination Request:
No. 90/011,918, Sep. 23, 2011

Reexamination Certificate for:
Patent No.: 7,915,773
Issued: Mar. 29, 2011
Appl. No.: 12/686,388
Filed: Jan. 13, 2010

Related U.S. Application Data

(63) Continuation of application No. PCT/JP2008/063868, filed on Aug. 1, 2008.

(30) Foreign Application Priority Data

Sep. 11, 2007 (JP) .......................................... 2007-235029

(51) Int. Cl.
*H02K 5/10* (2006.01)

(52) U.S. Cl. ............................................. 310/88; 310/83

(58) Field of Classification Search ........................ None
See application file for complete search history.

(56) References Cited

To view the complete listing of prior art documents cited during the proceeding for Reexamination Control Number 90/011,918, please refer to the USPTO's public Patent Application Information Retrieval (PAIR) system under the Display References tab.

*Primary Examiner* — Kenneth J Whittington

(57) ABSTRACT

A robot includes a plurality of motors that drive respective joint shafts and gas-tight chambers in which the motors are disposed. The robot is placed in a second ambience, and at least one of the joint shafts is provided with a hollow motor integrated with a reduction gear.

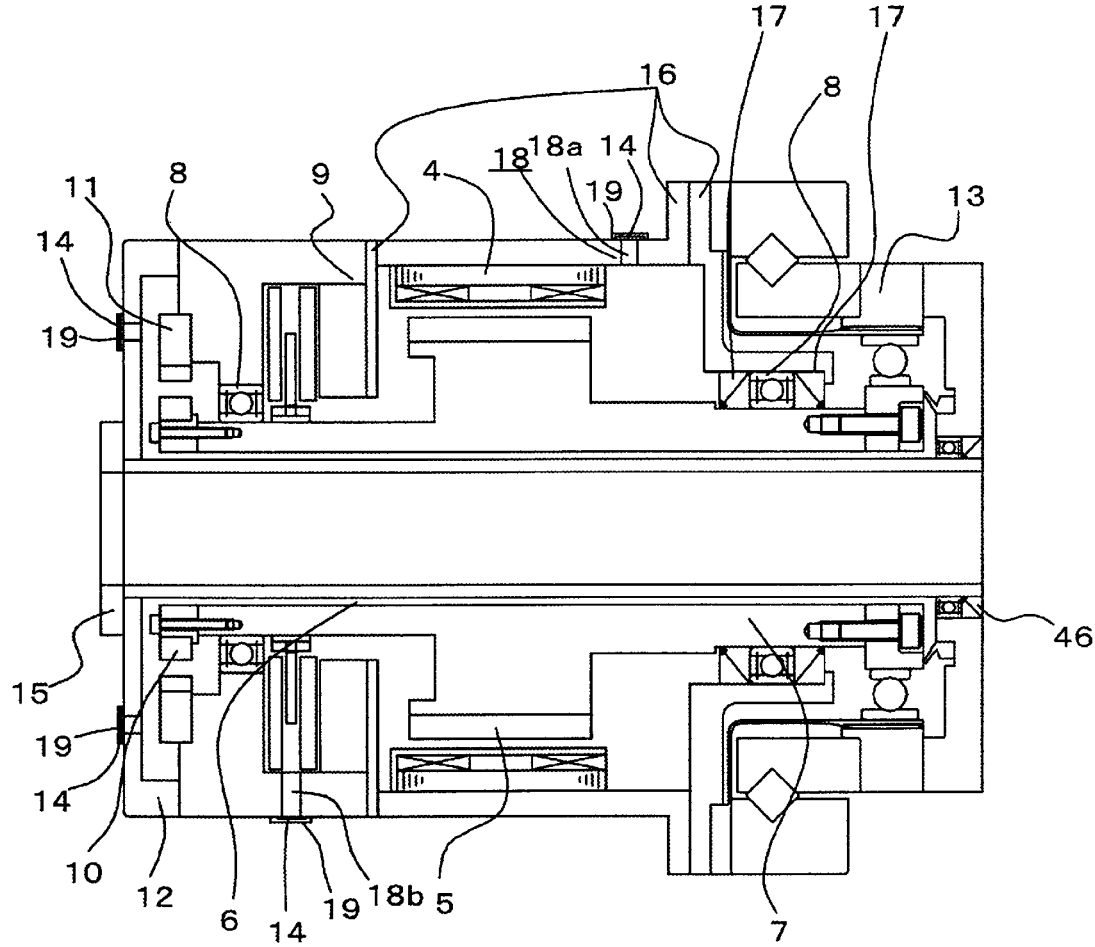

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4 and 9 are cancelled.

Claims 1 and 6 are determined to be patentable as amended.

Claims 2, 3, 5, 7, 8 and 10, dependent on an amended claim, are determined to be patentable.

1. A robot with an internal pressure explosion-proof structure, comprising:
   a plurality of motors that drive respective joint shafts; and
   gas-tight chambers in which the motors are disposed,
   wherein the robot is placed in a second ambience, and at least one of the joint shafts is provided with a hollow motor integrated with a reduction gear, [and]
   wherein a through hole is provided in the at least one of the joint shafts of the motor along an axial direction of the at least one of the joint shafts, *and*
   *wherein a motor section of the hollow motor integrated with the reduction gear is provided with a through hole in a space between an electromagnetic unit in the motor section and a sealing member disposed at the reduction-gear side, the through hole extending in a direction perpendicular to an axis of the hollow motor.*

6. A robot with an internal pressure explosion-proof structure, comprising:
   a plurality of motors that drive respective joint shafts; and
   gas-tight chambers in which the motors are disposed,
   wherein the robot is placed in a second ambience, and the joint shafts disposed in the gas-tight chambers that are provided in an upper arm of the robot are provided with a hollow motor integrated with a reduction gear, [and]
   wherein a through hole is provided in each of the joint shafts of the motor along an axial direction of the joint shafts, *and*
   *wherein a motor section of the hollow motor integrated with the reduction gear is provided with a through hole in a space between an electromagnetic unit in the motor section and a sealing member disposed at the reduction-gear side, the through hole extending in a direction perpendicular to an axis of the hollow motor.*

\* \* \* \* \*